(12) United States Patent
Johnson et al.

(10) Patent No.: US 10,322,503 B2
(45) Date of Patent: *Jun. 18, 2019

(54) TOOL HANDLE FOR HOLDING MULTIPLE TOOLS OF DIFFERENT SIZES DURING USE

(71) Applicant: Wagic, Inc., San Jose, CA (US)

(72) Inventors: Ronald L. Johnson, San Jose, CA (US); Robert J. Gallegos, Fremont, CA (US); Steven Simas Escobar, San Jose, CA (US); Anders Scot Hudson, Campbell, CA (US); Idriss Mansouri-Chafik Ruiz, San Jose, CA (US); Yugen Patrick Lockhart, Palo Alto, CA (US); Howard Allen Wilson, Santa Clara, CA (US); Eric M. Colton, Torrance, CA (US)

(73) Assignee: WAGIC, INC., San Jose, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/373,398

(22) Filed: Dec. 8, 2016

(65) Prior Publication Data

US 2017/0144293 A1 May 25, 2017

Related U.S. Application Data

(60) Continuation of application No. 12/482,243, filed on Jun. 10, 2009, now Pat. No. 9,545,707, which is a
(Continued)

(51) Int. Cl.
*B25G 1/00* (2006.01)
*B25G 1/06* (2006.01)
(Continued)

(52) U.S. Cl.
CPC ............ *B25G 1/063* (2013.01); *B25B 15/008* (2013.01); *B25G 1/005* (2013.01); *B25G 1/066* (2013.01); *B25H 3/003* (2013.01)

(58) Field of Classification Search
CPC ............................. B25B 15/008; B25B 13/56
See application file for complete search history.

(56) References Cited

U.S. PATENT DOCUMENTS

| 244,309 A | 7/1881 | Rhodes |
| 363,331 A | 5/1887 | Hammer |

(Continued)

FOREIGN PATENT DOCUMENTS

| CA | 1147176 | 5/1983 |
| CA | 1232781 A | 2/1988 |

(Continued)

*Primary Examiner* — David B. Thomas
(74) *Attorney, Agent, or Firm* — Haverstock & Owens LLP

(57) ABSTRACT

A circular, cylindrically shaped tool handle holds multiple sizes of tools. The handle includes one or more holding slots each positioned on the outer surface into which tools are inserted and held. Each holding slot includes one or more contoured compartments in which tools rest when engaged with the handle. Each contoured compartment is of a size and dimension which corresponds to one or more tool sizes. Each contoured compartment is formed about a corresponding receiving hole. A lock is positioned over the contoured compartment to irremovably confine the short leg of the hexagonal wrench within the contoured compartment. Hexagonal shaped tools other than wrenches are able to be used with the handle of the present invention such as screwdrivers and socket wrenches. A tool container stores the tools and the tool handle.

17 Claims, 14 Drawing Sheets

Related U.S. Application Data division of application No. 12/009,404, filed on Jan. 17, 2008, now Pat. No. 7,946,203.

(51) Int. Cl.
*B25B 15/00* (2006.01)
*B25H 3/00* (2006.01)

(56) References Cited

U.S. PATENT DOCUMENTS

| | | |
|---|---|---|
| 364,422 A | 6/1887 | Laforge |
| 580,235 A | 4/1897 | Strum |
| 647,528 A | 4/1900 | Schmidt |
| 655,007 A | 7/1900 | Rairigh |
| 696,995 A | 4/1902 | Moser |
| 763,745 A | 6/1904 | Gheen |
| 776,761 A | 12/1904 | Sampson |
| 873,363 A | 12/1907 | Ross |
| 875,493 A | 12/1907 | Beard |
| 890,150 A | 6/1908 | Marble |
| 959,408 A | 5/1910 | Volbert |
| 1,000,900 A | 8/1911 | Dorsey |
| 1,006,679 A | 10/1911 | Rice |
| 1,100,070 A | 6/1914 | Graham |
| 1,172,656 A | 2/1916 | Yorgensen |
| 1,187,842 A | 6/1916 | Kaas |
| D53,597 S | 7/1919 | Marcmann |
| 1,337,769 A | 4/1920 | Hemming |
| 1,398,583 A | 11/1921 | Bovee |
| 1,425,270 A | 8/1922 | Morgan |
| 1,500,852 A | 7/1924 | Shepard |
| 1,502,044 A | 7/1924 | McCann |
| 1,530,905 A | 3/1925 | Nance |
| 1,559,097 A | 10/1925 | Hill |
| 1,753,026 A | 4/1930 | Rosati |
| 1,825,936 A | 10/1931 | Bodmer |
| 1,915,245 A | 6/1933 | Cook |
| 1,970,409 A | 8/1934 | Wiedemann |
| 1,973,188 A | 9/1934 | Verderber |
| 2,332,656 A | 10/1943 | Mirando |
| D142,982 S | 11/1945 | Bloomfield |
| 2,409,613 A * | 10/1946 | Brooks .................. B25B 13/56 |
| | | 206/377 |
| 2,410,971 A | 11/1946 | Hartley |
| 2,465,152 A | 3/1949 | Ellison |
| 2,465,619 A | 3/1949 | Veit |
| 2,475,268 A | 7/1949 | Wittle |
| 2,485,991 A | 10/1949 | Stowell |
| D156,677 S | 12/1949 | Smith |
| D157,154 S | 2/1950 | Horton |
| 2,590,307 A | 4/1950 | Gibson |
| 2,512,967 A | 6/1950 | Quiron |
| 2,530,024 A | 11/1950 | Moody |
| 2,532,636 A | 12/1950 | Minnich |
| 2,878,701 A | 3/1951 | Weersma |
| 2,569,069 A | 9/1951 | Motel |
| 2,593,828 A | 4/1952 | Arey |
| 2,701,052 A | 2/1955 | Martel |
| D175,056 S | 6/1955 | Wilson |
| 2,715,028 A * | 8/1955 | Dossie .................. B25B 13/56 |
| | | 81/177.4 |
| 2,719,042 A | 9/1955 | Epsy |
| 2,726,091 A | 12/1955 | Topar |
| 2,776,589 A | 1/1957 | Gregory |
| 2,778,396 A | 1/1957 | Swain |
| 2,786,380 A | 3/1957 | Rolland |
| 2,797,599 A | 7/1957 | McGarvie |
| 2,800,816 A | 7/1957 | Tasciotti |
| 2,804,970 A | 9/1957 | Kuc et al. |
| 2,821,403 A | 1/1958 | Bevan |
| 2,836,210 A | 5/1958 | Garofalo |
| 2,842,020 A | 7/1958 | Tarquinio |
| 2,844,244 A | 7/1958 | Hanson |
| 2,851,915 A | 9/1958 | Martinez |
| 2,977,824 A | 4/1961 | Rueb |
| 3,061,927 A | 11/1962 | Von Frankenberg Und Ludwisdorf |
| 3,113,479 A | 12/1963 | Swingle |
| 3,156,143 A | 11/1964 | Wolf |
| 3,257,991 A | 6/1966 | Mosch |
| D205,745 S | 9/1966 | Nannfildt |
| 3,342,229 A | 9/1967 | Janes |
| 3,343,434 A | 9/1967 | Schroeder |
| 3,370,696 A | 2/1968 | Groe |
| 3,424,039 A | 1/1969 | Scott |
| 3,592,086 A | 7/1971 | Derwin |
| 3,654,975 A | 4/1972 | Ballsmith et al. |
| 3,667,518 A | 6/1972 | Stillwagon, Jr. |
| 3,766,811 A | 10/1973 | Callahan |
| 3,802,286 A | 4/1974 | Winklhofer et al. |
| 3,863,693 A | 2/1975 | Carriker |
| 3,943,801 A | 3/1976 | Yates |
| 3,958,469 A | 5/1976 | Meese |
| 4,000,767 A | 1/1977 | Geng |
| 4,043,230 A | 8/1977 | Scrivens |
| 4,124,915 A | 11/1978 | Schlicher |
| 4,154,125 A | 5/1979 | Frank |
| 4,196,761 A | 4/1980 | Royer |
| 4,227,430 A | 10/1980 | Jansson et al. |
| 4,235,269 A | 11/1980 | Kraus |
| 4,238,862 A | 12/1980 | Leatherman |
| 4,302,990 A | 12/1981 | Chrichton et al. |
| 4,308,770 A | 1/1982 | MacDonald |
| 4,310,094 A | 1/1982 | Hotchkiss |
| 4,327,790 A | 5/1982 | Stevens et al. |
| 4,384,499 A | 5/1983 | Shockley |
| 4,424,728 A | 1/1984 | MacDonald |
| 4,440,048 A | 4/1984 | Stevens |
| 4,448,097 A | 5/1984 | Rocca |
| 4,469,109 A | 9/1984 | Mehl |
| 4,476,751 A | 10/1984 | Mishima |
| 4,525,889 A | 7/1985 | Dunau |
| 4,542,667 A | 9/1985 | Jang |
| D284,810 S | 7/1986 | Kelemen, Sr. |
| 4,598,822 A | 7/1986 | Hemmings |
| 4,640,155 A | 2/1987 | Condon |
| 4,667,822 A | 5/1987 | Coopmans |
| 4,699,020 A | 10/1987 | Bush et al. |
| 4,699,030 A | 10/1987 | Yang |
| 4,703,673 A | 11/1987 | Allen |
| 4,711,353 A | 12/1987 | Rozmestor |
| 4,716,795 A | 1/1988 | Corona et al. |
| 4,716,796 A | 1/1988 | Corona et al. |
| 4,783,867 A | 11/1988 | Tsao |
| 4,787,276 A | 11/1988 | Condon |
| 4,815,346 A | 3/1989 | Littlehorn |
| 4,819,523 A | 4/1989 | Souza |
| 4,819,800 A | 4/1989 | Wilson |
| 4,820,090 A | 4/1989 | Chen |
| D302,102 S | 7/1989 | Amagaya |
| 4,882,841 A | 11/1989 | Margolis |
| 4,922,569 A | 5/1990 | Brinker et al. |
| 4,926,721 A | 5/1990 | Hsiao |
| D308,462 S | 6/1990 | Komatsu |
| 4,934,223 A | 6/1990 | Wong |
| D311,124 S | 10/1990 | Learney |
| 4,960,016 A | 10/1990 | Seals |
| 4,974,477 A | 12/1990 | Anderson |
| 4,979,407 A | 12/1990 | Hernandez et al. |
| 5,029,707 A | 7/1991 | Feng |
| 5,036,975 A | 8/1991 | Chow |
| 5,042,658 A | 8/1991 | Tiramani et al. |
| 5,062,173 A | 11/1991 | Collins et al. |
| 5,063,796 A | 11/1991 | Gennep |
| 5,065,487 A | 11/1991 | Yother |
| 5,086,674 A | 2/1992 | Her |
| 5,146,815 A | 9/1992 | Scott, III |
| 5,147,038 A | 9/1992 | Pergeau |
| D333,769 S | 3/1993 | Jureckson |
| D334,516 S | 4/1993 | Tsunoda |
| D339,048 S | 9/1993 | Baum |
| 5,251,352 A | 10/1993 | Cullison |
| 5,263,389 A | 11/1993 | Frazell et al. |
| 5,265,504 A | 11/1993 | Fruhm |

(56) References Cited

U.S. PATENT DOCUMENTS

| | | |
|---|---|---|
| D342,433 S | 12/1993 | Sorenson |
| 5,271,300 A | 12/1993 | Zurbuchen et al. |
| D343,106 S | 1/1994 | Eklind et al. |
| 2,346,364 A | 4/1994 | Dowe |
| 5,320,004 A | 6/1994 | Hsiao |
| 5,329,834 A | 7/1994 | Wong |
| 5,394,984 A | 3/1995 | Aiba |
| 5,416,940 A | 5/1995 | Bandera |
| D359,671 S | 6/1995 | Acosta |
| 5,421,225 A | 6/1995 | Chen |
| 5,450,774 A | 9/1995 | Chang |
| 5,450,775 A | 9/1995 | Kozak |
| 5,461,950 A | 10/1995 | Iwinski |
| 5,480,166 A | 1/1996 | Milsop |
| 5,495,942 A | 3/1996 | Izhak |
| 5,499,560 A | 3/1996 | Aeschliman |
| 5,499,562 A | 3/1996 | Feng |
| 5,505,316 A | 4/1996 | Lee |
| 5,515,969 A | 5/1996 | Schonenbach |
| 5,517,885 A | 5/1996 | Feng |
| 5,522,291 A | 6/1996 | Liu |
| 5,535,882 A | 7/1996 | Liu |
| 5,542,322 A | 8/1996 | Knox et al. |
| D373,943 S | 9/1996 | Fuhrman |
| D376,520 S | 9/1996 | Morin |
| 5,553,340 A | 9/1996 | Brown, Jr. |
| 5,566,596 A | 10/1996 | Lin |
| 5,581,834 A | 12/1996 | Collins |
| D377,444 S | 1/1997 | Lin |
| 5,592,859 A * | 1/1997 | Johnson ................ B25B 13/56 81/177.2 |
| D378,797 S | 4/1997 | Poremba et al. |
| 5,630,342 A | 5/1997 | Owoc |
| D380,131 S | 6/1997 | Sung |
| D382,190 S | 8/1997 | Blackston et al. |
| 5,653,525 A | 8/1997 | Park |
| D383,048 S | 9/1997 | Sorenson |
| 5,662,013 A | 9/1997 | Lin |
| D385,172 S | 10/1997 | Bramsiepe et al. |
| D386,955 S | 12/1997 | Jones et al. |
| 5,692,659 A | 12/1997 | Dembicks |
| 5,711,042 A | 1/1998 | Chuang |
| 5,711,194 A | 1/1998 | Anderson et al. |
| D394,792 S | 6/1998 | Bourque |
| D394,794 S | 6/1998 | Vasudeva |
| 5,758,870 A | 6/1998 | Weaver |
| 5,765,247 A | 6/1998 | Seber et al. |
| 5,765,454 A | 6/1998 | Barbulescu et al. |
| 5,768,960 A | 6/1998 | Archuleta |
| 5,791,211 A | 8/1998 | Bondhus et al. |
| 5,802,936 A | 9/1998 | Liu |
| 5,803,584 A | 9/1998 | Chung |
| 5,816,401 A | 10/1998 | Vasudeva et al. |
| 5,820,288 A | 10/1998 | Cole |
| 5,822,830 A | 10/1998 | Lin |
| D400,775 S | 11/1998 | Hsu |
| 5,855,274 A | 1/1999 | Piao |
| D405,335 S | 2/1999 | Lin |
| 5,911,799 A * | 6/1999 | Johnson ................ B25B 13/56 81/177.2 |
| 5,916,277 A | 6/1999 | Dallas |
| 5,916,341 A | 6/1999 | Lin |
| 5,918,513 A | 7/1999 | Ho |
| 5,918,741 A | 7/1999 | Vasudeva |
| 5,938,028 A | 8/1999 | Hu |
| 5,970,828 A | 10/1999 | Bondhus et al. |
| D415,946 S | 11/1999 | Tsai |
| 5,983,759 A | 11/1999 | Turner |
| 5,992,625 A * | 11/1999 | Loiselle ................ B25H 3/003 206/377 |
| 5,992,626 A | 11/1999 | Anderson |
| D420,885 S | 2/2000 | Lin |
| 6,032,332 A | 3/2000 | Lin |
| 6,032,796 A | 3/2000 | Hopper et al. |
| 6,044,973 A | 4/2000 | Vasudeva |
| 6,050,409 A | 4/2000 | Delbeck |
| D426,449 S | 6/2000 | Eklind |
| D426,450 S | 6/2000 | Eklind |
| D427,875 S | 7/2000 | Chiu |
| 6,085,620 A | 7/2000 | Anderson et al. |
| 6,088,861 A | 7/2000 | Sessions et al. |
| 6,089,133 A | 7/2000 | Liao |
| 6,095,018 A | 8/2000 | Schuster |
| 6,105,767 A | 8/2000 | Vasudeva |
| 6,119,560 A | 9/2000 | Anderson et al. |
| 6,128,981 A | 10/2000 | Bondhus et al. |
| 6,131,740 A | 10/2000 | Huang |
| D433,613 S | 11/2000 | Jailin |
| D433,910 S | 11/2000 | Oliver et al. |
| 6,151,998 A | 11/2000 | Fu-Hui |
| D435,415 S | 12/2000 | Johnson et al. |
| 6,164,172 A | 12/2000 | Huang |
| D435,773 S | 2/2001 | Lin |
| D437,541 S | 2/2001 | Hermansen et al. |
| D437,763 S | 2/2001 | Oliver et al. |
| 6,186,785 B1 | 2/2001 | Rogers et al. |
| 6,202,864 B1 | 3/2001 | Ernst et al. |
| 6,206,189 B1 | 3/2001 | Huot, Jr. et al. |
| D440,852 S | 4/2001 | Ernst |
| 6,209,425 B1 * | 4/2001 | Hu ................ B25B 15/008 81/177.1 |
| 6,233,769 B1 | 5/2001 | Seber et al. |
| 6,237,451 B1 | 5/2001 | Wei |
| 6,257,106 B1 | 7/2001 | Anderson et al. |
| 6,260,453 B1 | 7/2001 | Anderson et al. |
| 6,279,434 B1 | 8/2001 | Brown |
| 6,279,435 B1 | 8/2001 | Zayat, Jr. |
| D448,267 S | 9/2001 | Jean et al. |
| 6,289,768 B1 | 9/2001 | Anderson et al. |
| 6,308,599 B1 | 10/2001 | Fu-Hui |
| 6,311,587 B1 * | 11/2001 | Johnson ................ B25B 13/56 81/177.1 |
| 6,314,600 B1 | 11/2001 | Cachot |
| 6,314,838 B2 | 11/2001 | Wall |
| 6,318,218 B1 | 11/2001 | Anderson et al. |
| 6,332,381 B1 * | 12/2001 | Vasudeva ............. B25B 15/008 81/177.1 |
| 6,345,557 B1 | 2/2002 | Kuo |
| D454,766 S | 3/2002 | Lin |
| 6,352,010 B1 | 3/2002 | Giarritta et al. |
| 6,357,068 B1 | 3/2002 | Seber et al. |
| D455,630 S | 4/2002 | Chiu |
| 6,371,290 B1 | 4/2002 | Yearous et al. |
| 6,378,402 B1 | 4/2002 | Kalomeris et al. |
| 6,382,057 B1 | 5/2002 | Kienholz |
| 6,397,709 B1 | 6/2002 | Wall |
| 6,401,576 B1 | 6/2002 | Wu |
| 6,401,923 B1 | 6/2002 | Huang |
| D459,967 S | 7/2002 | Johnson et al. |
| D461,311 S | 8/2002 | Gharib |
| D462,002 S | 8/2002 | Jean et al. |
| 6,405,620 B2 | 8/2002 | Liao |
| 6,427,564 B1 | 8/2002 | Nelson |
| 6,490,954 B2 * | 12/2002 | Johnson ................ B25B 13/56 81/177.2 |
| 6,510,766 B1 * | 1/2003 | Lin ................ B25B 15/008 81/177.4 |
| D470,739 S | 2/2003 | Chen |
| D472,931 S | 4/2003 | Leins |
| 6,564,680 B1 | 5/2003 | Rinner et al. |
| 6,510,767 B1 | 7/2003 | Rivera |
| 6,598,503 B1 * | 7/2003 | Cunningham ........ B25B 15/008 81/177.4 |
| 6,601,481 B2 | 8/2003 | Chuang |
| 6,606,925 B1 | 8/2003 | Gmeilbauer |
| D479,963 S | 9/2003 | Chang |
| 6,634,502 B1 | 10/2003 | Yu |
| 6,640,675 B1 | 11/2003 | Chuang |
| 6,698,318 B2 | 3/2004 | Peters |
| 6,701,813 B2 | 3/2004 | Hu |
| 6,709,196 B1 | 3/2004 | Medendorp |
| 6,739,224 B1 | 5/2004 | Wershe |
| 6,751,819 B2 | 6/2004 | Chuang |
| 6,751,820 B1 | 6/2004 | Wu |

(56) References Cited

U.S. PATENT DOCUMENTS

| | | |
|---|---|---|
| 6,752,046 B1 | 6/2004 | Lee |
| 6,758,350 B2 | 7/2004 | Lin |
| 6,763,744 B2 * | 7/2004 | Johnson .............. B25B 13/56 |
| | | 81/177.2 |
| D494,438 S | 8/2004 | Falkenstein |
| 6,799,490 B1 | 10/2004 | Chu |
| 6,827,210 B2 | 12/2004 | Chen |
| 6,863,471 B2 | 3/2005 | Medendorp |
| 6,877,186 B2 | 4/2005 | Shiao |
| 6,896,136 B2 | 5/2005 | Hu |
| 6,918,323 B2 | 7/2005 | Arnold et al. |
| 6,922,870 B2 | 8/2005 | Tontz, Sr. |
| 6,925,910 B2 | 8/2005 | Alford |
| 6,935,212 B2 | 8/2005 | Wadsworth |
| 6,941,843 B2 * | 9/2005 | Johnson .............. B25B 13/56 |
| | | 81/177.2 |
| 6,948,406 B1 | 9/2005 | Li |
| 6,971,291 B2 * | 12/2005 | An ..................... B25B 15/008 |
| | | 81/177.2 |
| 6,988,616 B2 | 1/2006 | Chen |
| D517,391 S | 3/2006 | Leins |
| 7,047,847 B2 | 5/2006 | Chuang |
| 7,051,626 B1 | 5/2006 | Chen |
| 7,051,629 B2 | 5/2006 | Huang |
| 7,073,418 B2 * | 7/2006 | Kuo ..................... B25B 15/008 |
| | | 81/177.2 |
| 7,080,582 B2 | 7/2006 | Karle |
| 7,100,476 B1 | 9/2006 | Feit |
| 7,131,358 B2 | 11/2006 | Hsien |
| 7,140,280 B2 | 11/2006 | Hawkins et al. |
| 7,155,998 B1 | 1/2007 | Shyu |
| 7,159,491 B1 | 1/2007 | Chaconas et al. |
| 7,165,479 B1 | 1/2007 | Lee |
| 7,168,345 B1 | 1/2007 | Hsieh |
| 7,182,003 B1 | 2/2007 | Hsieh |
| 7,216,569 B2 | 5/2007 | Abdelgany |
| 7,185,565 B1 | 6/2007 | Hu |
| 7,237,463 B1 | 7/2007 | Lee |
| D548,464 S | 8/2007 | Lin |
| D549,069 S | 8/2007 | Lin et al. |
| 7,281,454 B2 * | 10/2007 | Johnson .............. B25B 13/56 |
| | | 81/177.1 |
| 7,284,466 B1 | 10/2007 | Ho |
| 7,287,450 B1 | 10/2007 | Liao |
| D557,099 S | 12/2007 | Lin |
| 7,305,908 B2 | 12/2007 | Chi |
| 7,406,896 B2 | 8/2008 | Rivera |
| 7,409,894 B1 | 8/2008 | Valentine |
| 7,415,745 B2 | 8/2008 | Rivera |
| 7,467,574 B1 | 12/2008 | Lin |
| 7,571,517 B2 | 8/2009 | Smith et al. |
| 7,600,640 B2 | 10/2009 | Hallee et al. |
| D604,509 S | 11/2009 | Andrews |
| 7,698,972 B2 | 4/2010 | Hi |
| 7,743,685 B2 | 6/2010 | Chang |
| D622,125 S | 8/2010 | Robinson |
| D623,037 S | 9/2010 | Johnson et al. |
| 7,788,996 B2 * | 9/2010 | Johnson .............. B25B 13/56 |
| | | 81/177.1 |
| 7,810,415 B2 | 10/2010 | Adamany et al. |
| 7,815,058 B2 | 10/2010 | Cheng |
| 7,836,534 B2 | 11/2010 | Simmons |
| 7,846,203 B2 | 12/2010 | Cribier |
| 7,946,203 B2 * | 5/2011 | Johnson .............. B25G 1/063 |
| | | 81/439 |
| 8,011,277 B2 | 9/2011 | Johnson et al. |
| 8,015,642 B1 | 9/2011 | Oakley |
| D650,257 S | 12/2011 | Royes et al. |
| 8,336,428 B2 | 12/2012 | Johnson et al. |
| 8,359,954 B2 | 1/2013 | Johnson et al. |
| 8,468,916 B2 | 6/2013 | Johnson et al. |
| 8,613,121 B1 | 12/2013 | White |
| 8,621,963 B2 | 1/2014 | Johnson et al. |
| 8,640,574 B2 | 2/2014 | Johnson et al. |
| 8,757,033 B2 | 6/2014 | Johnson |
| 8,875,601 B2 | 11/2014 | Johnson et al. |
| 8,925,429 B2 | 1/2015 | Johnson |
| 9,144,801 B2 | 9/2015 | Johnson |
| 9,604,349 B2 | 3/2017 | Johnson |
| 2001/0005576 A1 | 6/2001 | Rogers et al. |
| 2001/0012754 A1 | 8/2001 | Anderson |
| 2001/0045145 A1 | 11/2001 | Legg |
| 2003/0000902 A1 | 1/2003 | Keis et al. |
| 2003/0047474 A1 | 3/2003 | Dahlson |
| 2003/0136234 A1 | 7/2003 | Cunningham |
| 2003/0188610 A1 | 10/2003 | Lin |
| 2003/0226428 A1 | 12/2003 | Liu |
| 2004/0050218 A1 | 3/2004 | Napoli |
| 2004/0079622 A1 | 4/2004 | Wang |
| 2004/0262344 A1 | 12/2004 | White |
| 2005/0011318 A1 | 1/2005 | Tsai |
| 2005/0199108 A1 | 9/2005 | Jheng |
| 2005/0211587 A1 | 9/2005 | Chen |
| 2005/0229752 A1 | 10/2005 | Nickpuck |
| 2005/0245900 A1 | 11/2005 | Ash |
| 2005/0247587 A1 | 11/2005 | Holland-Letz |
| 2005/0268752 A1 | 12/2005 | Johnson et al. |
| 2005/0268754 A1 | 12/2005 | Fa |
| 2005/0284267 A1 | 12/2005 | Liao et al. |
| 2006/0042428 A1 | 3/2006 | Chuang |
| 2006/0101955 A1 * | 5/2006 | Chang ................ B25B 15/008 |
| | | 81/490 |
| 2006/0118500 A1 | 6/2006 | Chen |
| 2006/0150784 A1 | 7/2006 | Hsieh |
| 2006/0213059 A1 | 9/2006 | Eggert |
| 2006/0254396 A1 | 11/2006 | Hu |
| 2006/0288531 A1 | 12/2006 | Hu |
| 2007/0007222 A1 | 1/2007 | Kao |
| 2007/0023306 A1 | 2/2007 | Lai |
| 2007/0044598 A1 | 3/2007 | Frohm et al. |
| 2007/0056117 A1 | 3/2007 | Gardiner et al. |
| 2007/0056872 A1 | 3/2007 | Begin |
| 2007/0062831 A1 | 3/2007 | Chen |
| 2007/0084740 A1 | 4/2007 | Malek |
| 2007/0141885 A1 | 6/2007 | Chen |
| 2007/0151402 A1 | 7/2007 | Schneeman et al. |
| 2007/0186731 A1 | 8/2007 | Schnarr et al. |
| 2007/0221017 A1 | 9/2007 | Heaven |
| 2007/0228672 A1 | 10/2007 | Huang |
| 2007/0235360 A1 | 10/2007 | Lin |
| 2007/0245862 A1 | 10/2007 | Gonzalez et al. |
| 2007/0295171 A1 | 12/2007 | Johnson et al. |
| 2008/0011634 A1 | 1/2008 | Lin |
| 2008/0164171 A1 | 7/2008 | Meng |
| 2008/0223179 A1 | 9/2008 | Nash et al. |
| 2008/0256816 A1 | 10/2008 | Consentino |
| 2008/0295657 A1 | 12/2008 | Cluthe |
| 2009/0107303 A1 | 4/2009 | Steinweg et al. |
| 2009/0183608 A1 | 7/2009 | Johnson et al. |
| 2009/0183609 A1 | 7/2009 | Johnson et al. |
| 2009/0241740 A1 | 10/2009 | Heagerty |
| 2010/0258465 A1 | 10/2010 | Gomas |
| 2011/0000024 A1 | 1/2011 | Johnson et al. |
| 2011/0094910 A1 | 4/2011 | Fleury et al. |
| 2012/0012485 A1 | 1/2012 | Wang |
| 2013/0112615 A1 | 5/2013 | Tsukaguchi |
| 2013/0228484 A1 | 9/2013 | Yang |
| 2013/0228539 A1 | 9/2013 | Lin |
| 2013/0256168 A1 | 10/2013 | Poillot |
| 2013/0306508 A1 | 11/2013 | Gallegos |
| 2014/0091118 A1 | 4/2014 | Hsiao |
| 2015/0001113 A1 | 1/2015 | Hsiao |

FOREIGN PATENT DOCUMENTS

| | | |
|---|---|---|
| CN | 2628230 Y | 7/2004 |
| DE | 464002 | 8/1928 |
| DE | 2035793 B1 | 3/1972 |
| DE | 2453480 | 5/1976 |
| DE | 3744176 A1 | 8/1989 |
| DE | 102004011892 | 1/2005 |
| DE | 202004013404 U1 | 3/2005 |
| DE | 20 2007 003841 U1 | 9/2007 |

(56) References Cited

FOREIGN PATENT DOCUMENTS

| | | |
|---|---:|---:|
| EP | 503559 A1 | 9/1992 |
| EP | 618046 A1 | 5/1994 |
| EP | 01693163 | 2/2006 |
| EP | 01777042 | 4/2007 |
| FR | 787512 | 9/1935 |
| GB | 856223 | 12/1960 |
| JP | 55-45442 | 3/1980 |
| JP | 57-13165 | 1/1982 |
| JP | 61136778 | 6/1986 |
| JP | 3-47775 | 5/1991 |
| JP | 03103162 | 10/1991 |
| JP | 4-29368 | 3/1992 |
| JP | 5-31882 | 4/1993 |
| JP | 08505812 | 6/1996 |
| TW | I236402 | 7/2005 |
| TW | M284496 | 1/2006 |
| TW | M284500 | 1/2006 |
| TW | M296765 | 9/2006 |
| TW | I270445 | 1/2007 |
| WO | 83/01406 | 4/1983 |
| WO | 9412322 | 6/1994 |
| WO | 199623631 | 8/1996 |
| WO | 97/29887 | 8/1997 |

\* cited by examiner

TOOL HANDLE FOR HOLDING MULTIPLE TOOLS OF DIFFERENT SIZES DURING USE

RELATED APPLICATIONS

This Application is a continuation of co-pending U.S. patent application Ser. No. 12/482,243, filed on Jun. 10, 2009 and entitled "TOOL HANDLE FOR HOLDING MULTIPLE TOOLS OF DIFFERENT SIZES DURING USE," which is a divisional of U.S. patent application Ser. No. 12/009,404, filed on Jan. 17, 2008 and entitled "TOOL HANDLE FOR HOLDING MULTIPLE TOOLS OF DIFFERENT SIZES DURING USE," now issued as U.S. Pat. No. 7,946,203, the contents of which are all hereby incorporated by reference.

FIELD OF THE INVENTION

The present invention relates to the field of hand held tools. More specifically, the present invention relates to the field of hexagonal wrenches and related safety, comfort, and convenience accessories and tools.

BACKGROUND OF THE INVENTION

Hexagonal wrenches or tool drivers, also referred to as allen wrenches or L-wrenches, have a hexagonal L-shaped body, including a long leg member and a short leg member. The end of either leg member is able to be inserted into a head of a screw or tool designed to accept a hexagonal wrench. Once inserted, rotational pressure is applied to the hexagonal wrench in order to tighten or loosen the screw. The leg members of the hexagonal wrench are designed to be of different lengths in order to allow a user flexibility when using the wrench in different environments and situations. For example, in a narrow, confined environment, the long leg of the hexagonal wrench is inserted into the head of the screw and the user will apply rotational pressure to the short leg. Or, if the environment is not so confined, the user is able to insert the short leg of the hexagonal wrench into the head of the screw and apply rotational pressure to the long leg.

Hexagonal wrenches are manufactured and distributed in multiple English and metric sizes in order to facilitate their use with screw heads of multiple sizes. Such wrenches are usually sold in a set which includes wrenches of multiple sizes but are also distributed individually.

When using a hexagonal wrench, a user will insert an end of the hexagonal wrench into the head of a workpiece such as a screw, and will then exert rotational pressure on the opposite end of the wrench in order to tighten or loosen the screw. Because of the size and dimensions of the hexagonal wrench it is particularly difficult to exert a great amount of rotational pressure on the hexagonal wrench when the long leg of the hexagonal wrench is inserted into the head of the screw. Because the hexagonal wrench is typically turned with the user's fingers, the user is able to also experience scrapes and cuts from the use of hexagonal wrenches in this manner. Ingenuitive users have also used other tools, including vice grips, pliers and the like, to turn hexagonal wrenches. However, this method is disadvantageous because such tools are able to lose their hold on the hexagonal wrench when rotational pressure is applied or are able to even bend or otherwise disfigure the hexagonal wrench.

SUMMARY OF THE INVENTION

A circular, cylindrical-shaped tool handle holds multiple sizes of tools, one tool at a time. The tool handle includes one or more holding slots, each positioned on the outer surface into which tools are inserted and held. Each holding slot includes one or more contoured compartments in which tools rest when engaged with the tool handle. Each contoured compartment is of a size and dimension which corresponds to one or more tool sizes.

In use, a tool such as a hexagonal wrench is positioned in an appropriate holding slot with the short leg or mounting end of the hexagonal wrench resting in the contoured compartment within the appropriate holding slot and the long leg of the hexagonal wrench protruding through an aperture or receiving hole formed through the bottom of the holding slot and penetrating the tool handle. The long leg has a proximal end for driving an appropriate screw or tool such as one with a head including a hexagonal-shaped recess. A lock is then positioned over the contoured compartment to irremovably confine the short leg of the hexagonal wrench within the contoured compartment and the appropriate holding slot. The lock has a cavity for coupling the lock to the tool handle by inserting the tool handle through the cavity. In some embodiments, the lock is selectively positionable along the length of the tool handle. The lock is able to be positioned to hold a tool in any one of the contoured compartments within any one of the holding slots. A user's movement of the lock is enhanced by external ridges on the lock.

A tool container of the present invention is designed to hold tools and a tool handle. A retaining mechanism and a securing mechanism are used in conjunction to enable the tool container and tools to be displayed without being removable until both the retaining mechanism and securing mechanism are removed appropriately later on, particularly after purchase.

DETAILED DESCRIPTION OF THE PREFERRED EMBODIMENT

Figure 1:
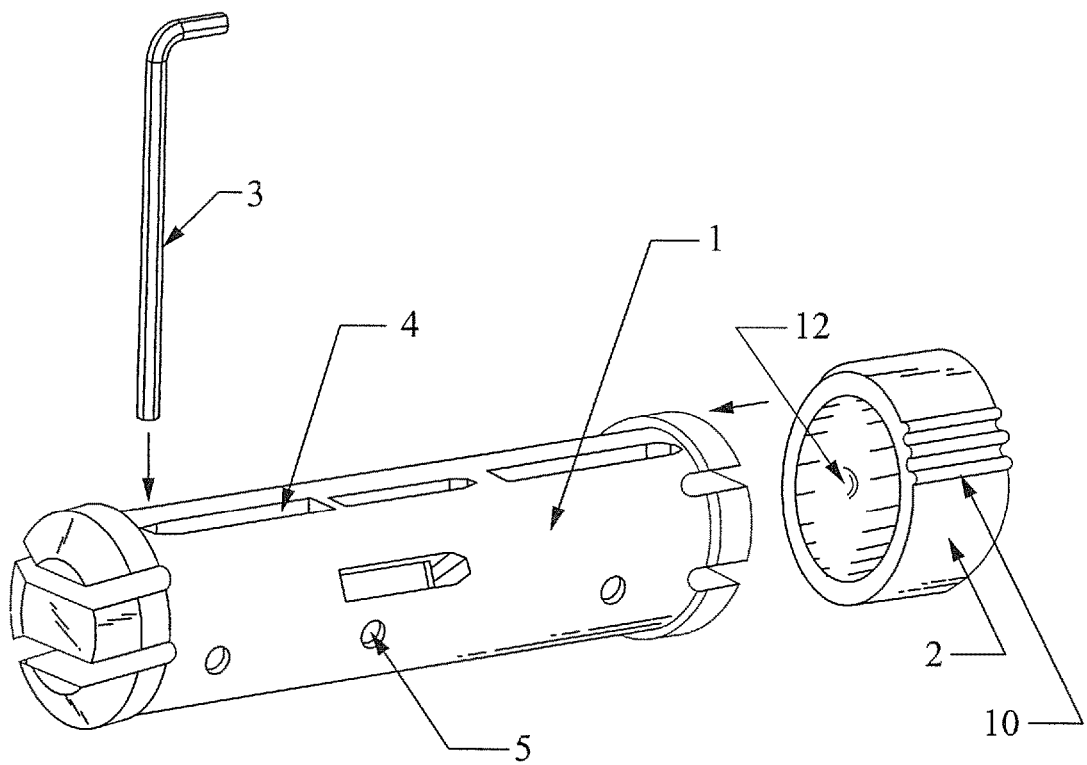
FIG. 1 illustrates a perspective view of an embodiment of the present invention showing the relationship of both a hexagonal wrench and a lock to a tool handle.

A perspective view of the hexagonal wrench handle 1 with a circular shape of an embodiment of the present invention is illustrated in FIG. 1. Multiple sizes of hexagonal wrenches 3 are able to be inserted into and held by the handle 1 in an appropriate sized holding slot 4. When inserted into the handle 1, a hexagonal wrench 3 is positioned in the appropriately sized holding slot 4 with the short leg or mounting end of the hexagonal wrench 3 resting in the holding slot 4 and the long leg of the hexagonal wrench extending through an aperture formed through a bottom of the holding slot 4 and penetrating the handle 1. The hexagonal wrench 3 includes an elongated rod having a bend through a predetermined angle. A proximal end of the hexagonal wrench 3 is for engaging a tool or screw which is driven by the hexagonal wrench 3. The short leg member or mounting end of the hexagonal wrench 3 extends from the bend to a distal end.

Once a hexagonal wrench 3 is inserted into the handle 1 and rests in an appropriately sized holding slot 4, a lock 2 is slid along the handle 1 and positioned over the holding slot 4 and the short leg of the hexagonal wrench 3, thereby locking the hexagonal wrench 3 within the holding slot 4. In some embodiments, the lock 2 contains a cam 12, a bump or another appropriate implementation on the inside of the lock 2 for securing the lock 2 in place. When a cam is used, rotating action by the user, roughly a quarter turn, wedges the cam against the handle 1 and the wrench 3.

Figure 2:
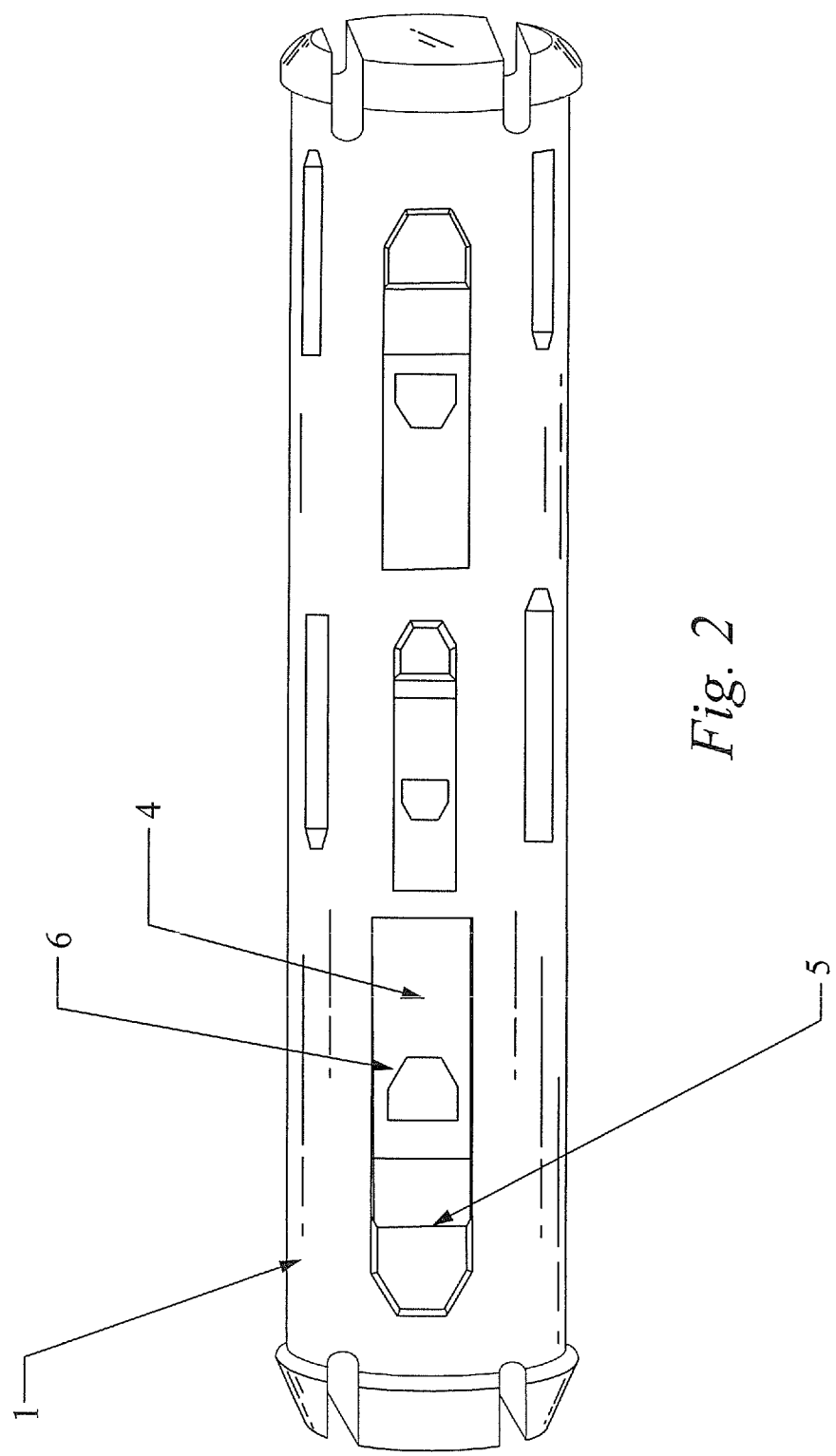
FIG. 2 illustrates a top view of a tool handle according to an embodiment of the present invention.

FIG. 2 illustrates a top view of the handle 1. When the wrench 3 (FIG. 1) is positioned within the appropriate sized holding slot 4, the long leg of the hexagonal wrench 3 extends through a corresponding receiving hole 5 in the handle 1. The holding slot 4 and the receiving hole 5 are of a size to accept the corresponding hexagonal wrench 3 and hold it firmly so that it will not rotate or twist in the holding slot 4 during use. The receiving hole 5 extends through the full width of the handle 1. In order to maximize the flexibility of the handle 1 of the embodiment illustrated in FIG. 2, a receiving hole for a first sized hexagonal wrench is able to extend through a holding slot for a second sized hexagonal wrench on a diametrically opposing side of the handle 1. For example, the receiving hole 6 extends from a holding slot positioned on the bottom of the handle 1, with the top of the handle illustrated in FIG. 2. Because the receiving hole 6 extends through the full width of the handle 1, it has an opening in the holding slot 4. When a hexagonal wrench is held by the handle 1 and positioned in the holding slot on the bottom of the handle 1, the long leg of the hexagonal wrench will extend through the receiving hole 6 and also through the holding slot 4.

The handle 1 has a circular, cylindrical shape having two ends and a circular, cylindrical surface.

Figure 3:
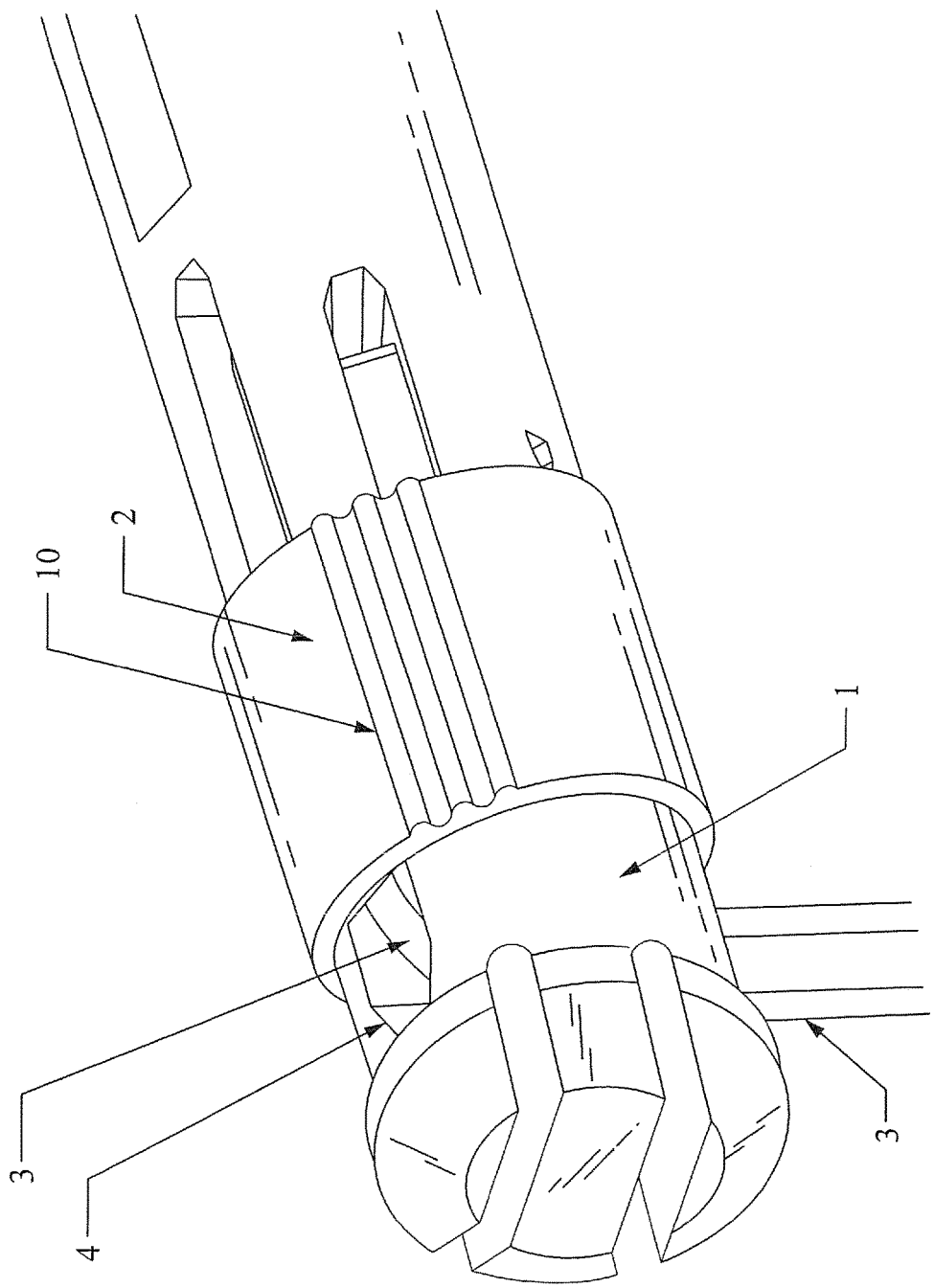
FIG. 3 illustrates a hexagonal wrench locked into a tool handle according to an embodiment of the present invention.
Figure 4:
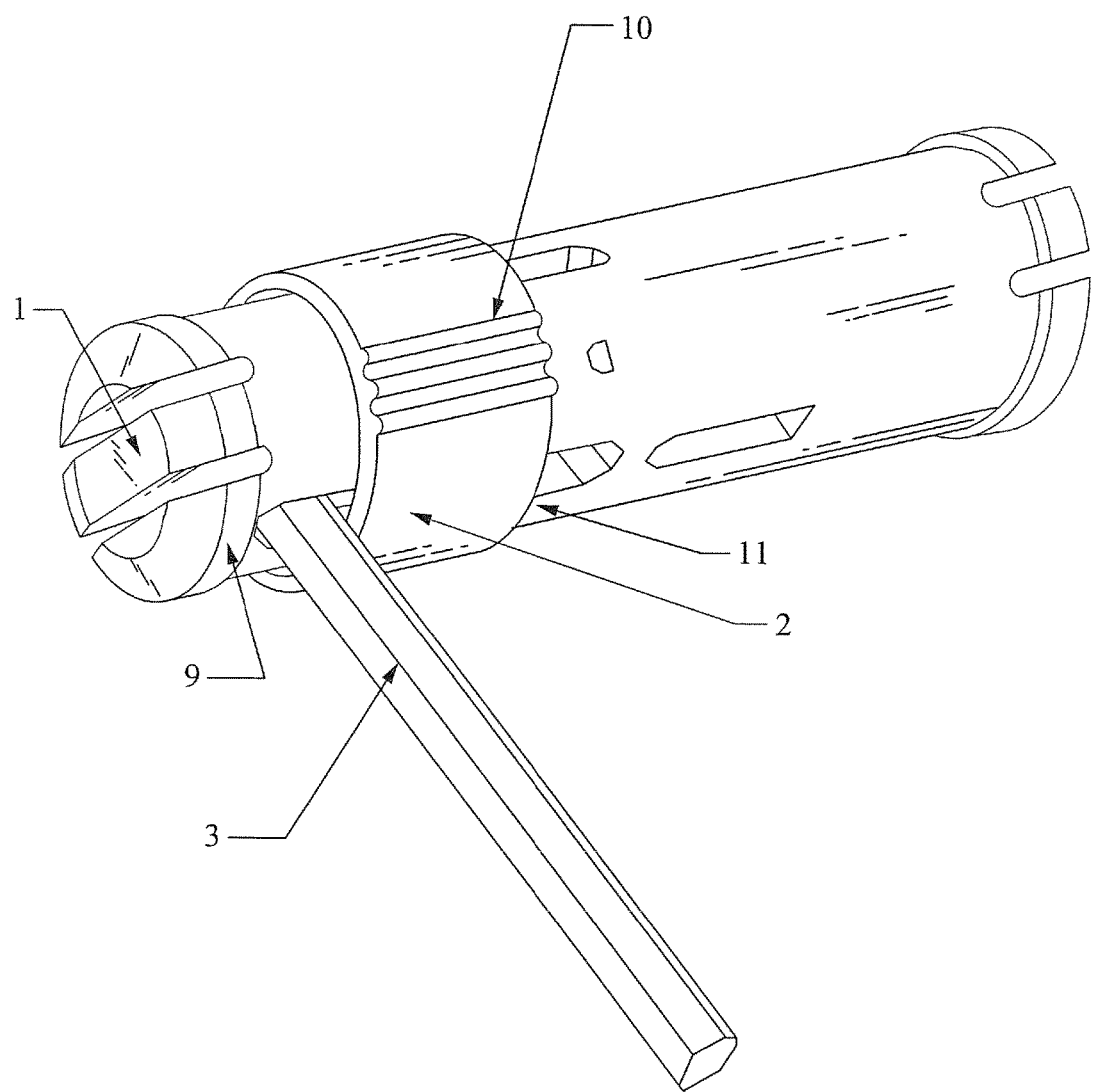
FIG. 4 illustrates a wrench locked into a handle according to an embodiment of the present invention.

FIGS. 3 and 4 illustrate a hexagonal wrench 3 locked within a holding slot 4 of the handle 1 by the lock 2. The holding slots 4 of the handle are designed to be of a depth which will leave the top of the short leg of the wrench 3 flush with the top of the handle 1 so that when the lock 2 is positioned over the wrench 3 it will tightly hold the short leg of the wrench 3 within the holding slot 4 and will not allow it to rotate or twist during use. In some embodiments, the bottom of the lock 2 is designed with a separation 11 which allows the long leg of the wrench 3 to protrude through it.

Figure 5:
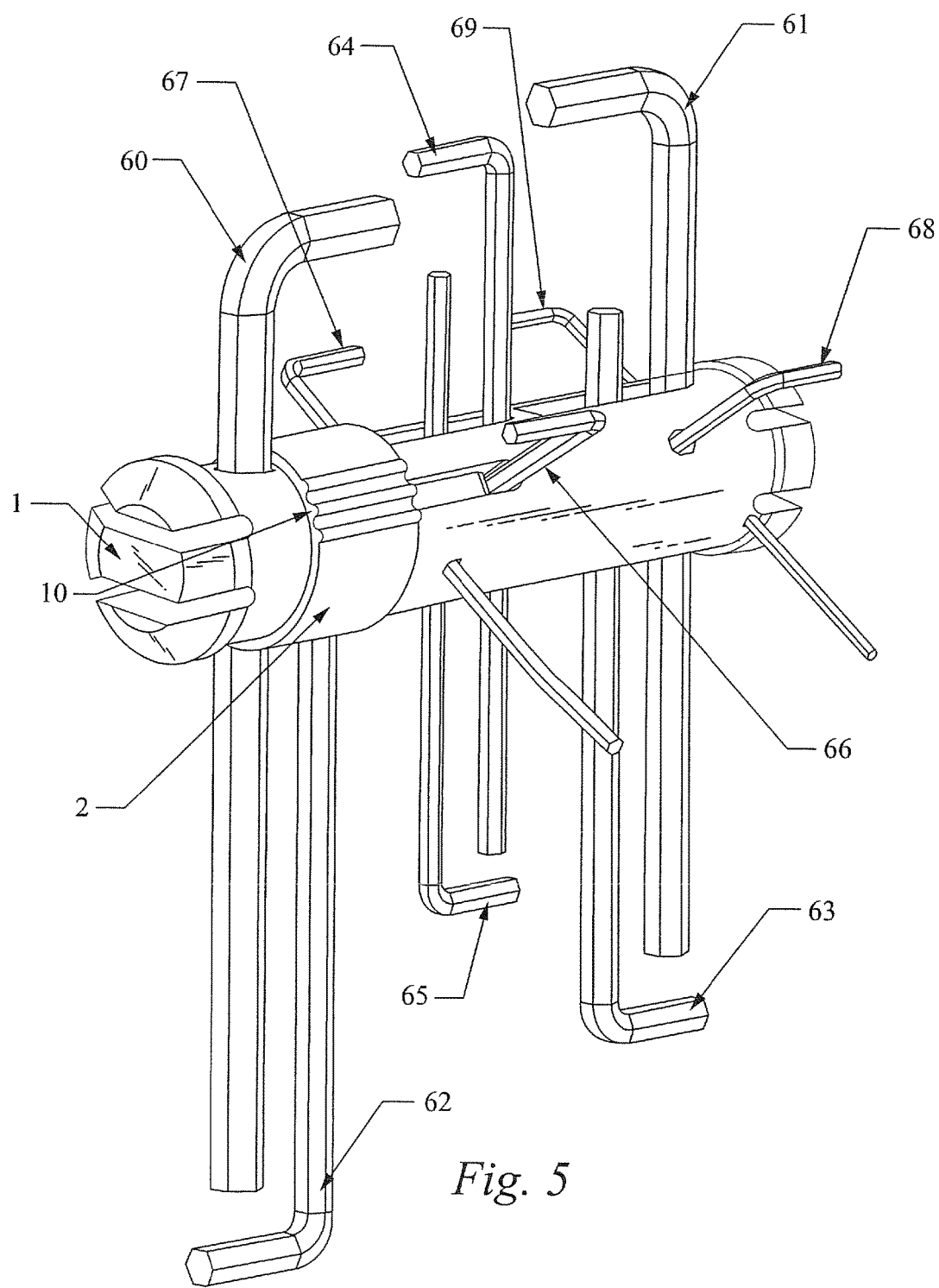
FIG. 5 illustrates the multiple sizes of hexagonal wrenches which are able to be inserted into a tool handle according to an embodiment of the present invention.

FIG. 5 illustrates the multiple sizes of hexagonal wrenches which are able to be used with the handle 1 of an embodiment of the present invention. As stated above, each holding slot 4 is of a size which corresponds to a size of a conventional hexagonal wrench. In order to enhance the user's ability to exert rotational pressure on the larger hexagonal wrenches, the holding slots 4 which hold the larger wrenches 3 are oriented at the ends of the handle 1 of this embodiment. The holding slots 4 corresponding to smaller wrenches 3 are oriented in the middle of the handle 1 and when in use form a "T"-shaped handle. The drawing of FIG. 5 is for illustration purposes only, when in use the handle 1 of the present invention is designed to work with one hexagonal wrench at a time.

The handle 1 of an embodiment of the present invention illustrated in FIG. 5 is designed to hold hexagonal wrenches of English sizes including a $9/32$ inch hexagonal wrench 60, a $1/4$ inch hexagonal wrench 61, a $7/32$ inch hexagonal wrench 62, a $3/16$ inch hexagonal wrench 63, a $5/32$ inch hexagonal wrench 64, a $9/64$ inch hexagonal wrench 65, a $1/8$ inch hexagonal wrench 66, a $7/64$ inch hexagonal wrench 67, a $3/32$ inch hexagonal wrench 68, a $5/64$ inch hexagonal wrench 69 and/or other sized hexagonal wrenches. In an alternate configuration of an embodiment of the handle 1 of the present invention, designed to hold hexagonal wrenches of metric sizes, the wrench 60 would be a 10 mm hexagonal wrench, the wrench 61 would be an 8 mm hexagonal wrench, the wrench 62 would be a 6 mm hexagonal wrench, the wrench 63 would be a 5 mm hexagonal wrench, the wrench 64 would be a 4.5 mm hexagonal wrench, the wrench 65 would be a 4 mm hexagonal wrench, the wrench 66 would be a 3.5 mm hexagonal wrench, the wrench 67 would be a 3 mm hexagonal wrench, the wrench 68 would be a 2.5 mm hexagonal wrench and the wrench 69 would be a 2 mm hexagonal wrench. In some embodiments, the size of the wrench 3 which corresponds to the holding slot 4 is molded into, printed on, or engraved into the handle 1 to aid the user in efficiently finding the appropriate holding slot 4 for the necessary wrench 3.

The lock 2 of an embodiment of the present invention is able to be positioned over any of the holding slots 4 for holding any of the hexagonal wrenches in place during use. The top of the lock 2 is rotated around the handle so that it is directly over the appropriate holding slot 4 and the separation 11 is positioned to allow the long leg member of the hexagonal wrench to extend therethrough.

The handle 1 is approximately 4.5 inches in length. The handle 1 is designed to provide a comfortable, user-friendly interface to a user's hand, in order to enhance a user's ability to exert rotational pressure on the hexagonal wrench 3 without subjecting the user to personal injury or requiring the use of additional tools.

The handle 1 is able to be composed of any appropriate material, which is of maximum strength and includes properties which resist materials that the handle will likely be exposed to, e.g., oil, grease, gasoline and the like. In some embodiments, the handle 1 is materially composed of polypropylene or other semi-crystalline polymer combination. Alternatively, the handle 1 is able to be materially composed of any suitable composition including, but not limited to aluminum or steel.

In some embodiments, the handle 1 of an embodiment of the present invention is constructed using an injection molded, core/cavity process as is well known in the art. Alternatively, the handle 1 is able to be constructed in any known manner.

The lock 2 is materially composed of a polypropylene-based material or other semi-crystalline polymer combination-based material in some embodiments but is able to also be composed of any appropriate material.

Figure 6:
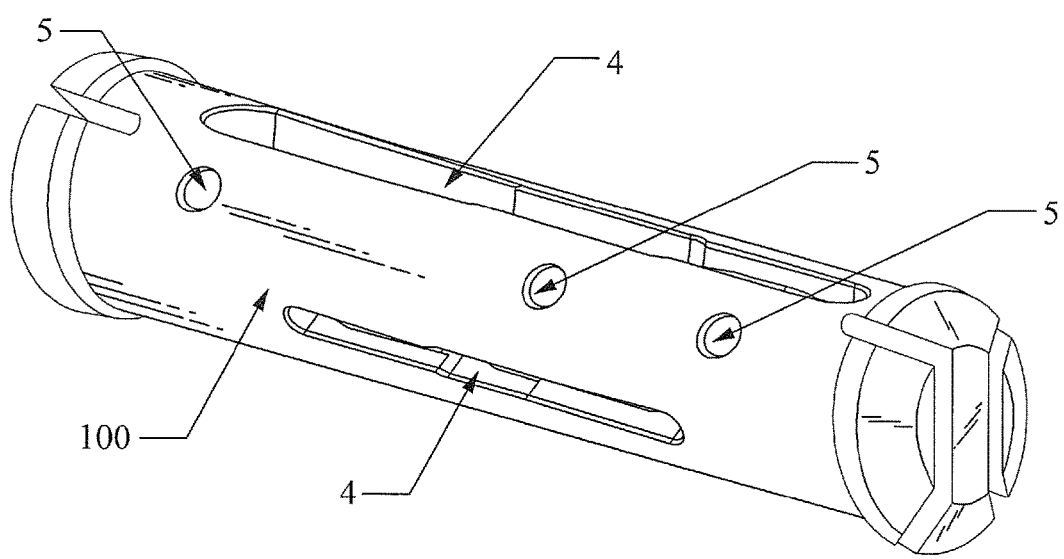
FIG. 6 illustrates an embodiment of the handle of the present invention with continuous holding slots.

An embodiment of a handle 100 according to the present invention is illustrated in FIG. 6. In this embodiment, the holding slots 4 are continuous along the surface of the handle 100. Not all hexagonal wrenches are uniform in size and dimensions. The hexagonal wrenches manufactured by one manufacturer are able to have different dimensions than hexagonal wrenches manufactured by another manufacturer. Specifically, the lengths of the short legs of hexagonal wrenches are able to be different depending on the manufacturer. The continuous holding slots 4 of an embodiment of the present invention allow for use with hexagonal wrenches having different length short legs. When using a hexagonal wrench with a longer short leg the continuous holding slot 4 will receive and hold the extra length of the short leg. In this manner, hexagonal wrenches of different dimensions from multiple manufacturers are able to be accommodated by the handle 100 with continuous holding slots 4.

Also, in the handle 100 of an embodiment of the present invention, the continuous holding slots are positioned on the circularly, cylindrically shaped handle 100 and the corresponding receiving holes 5 are positioned diametrically opposed, without a continuous holding slot 4. It should be apparent to those skilled in the art that the continuous holding slots 4 within the handle 100 of an embodiment of the present invention is able to be positioned on any surface of the handle 100.

Figure 7:
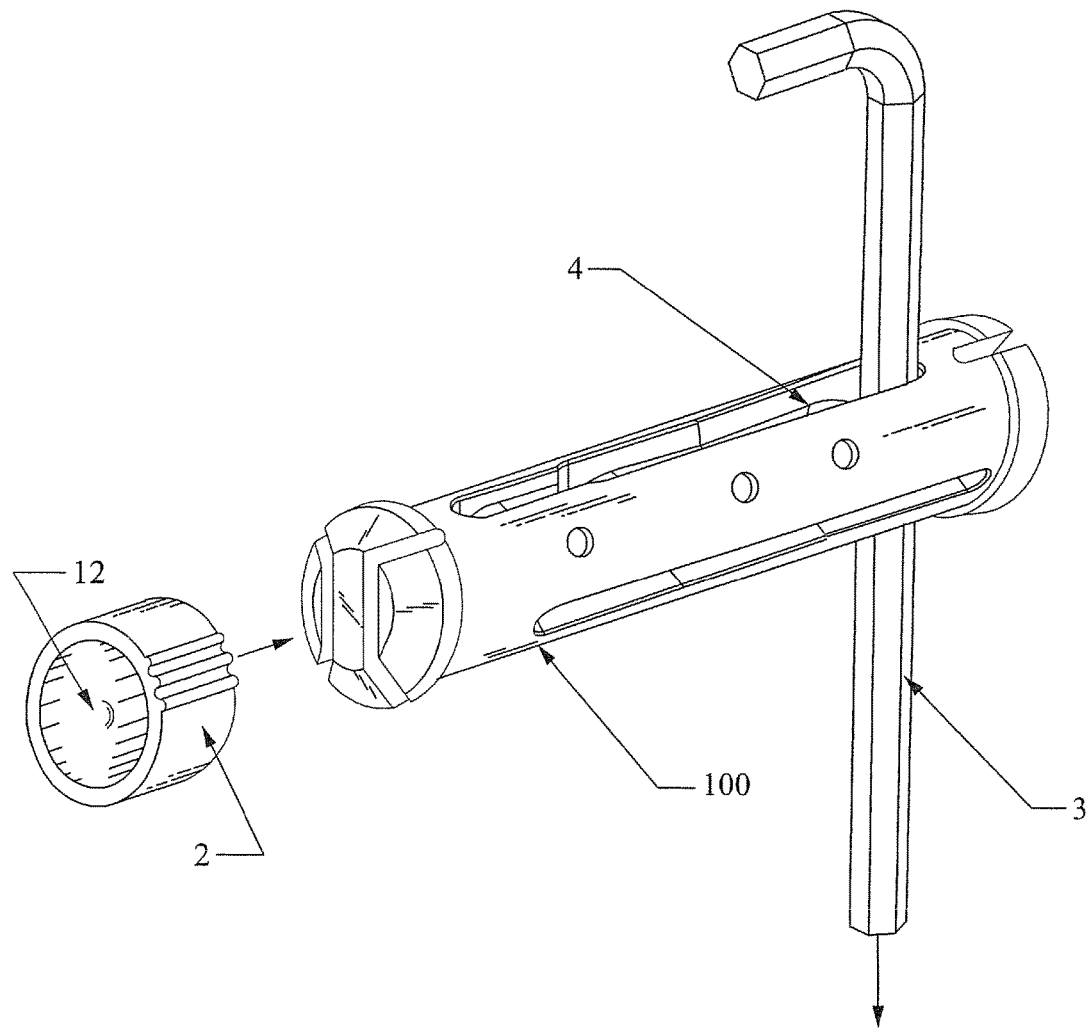
FIG. 7 illustrates a perspective view of a tool handle according to an embodiment of the present invention with a hexagonal wrench inserted through an appropriate receiving hole and showing a slidable lock positioned relative to the lock positioning slots.

The placement of a hexagonal wrench 3 into a continuous holding slot 4 is illustrated in FIG. 7. The long leg of the hexagonal wrench 3 is inserted, as described above, into the appropriately sized receiving hole until the short leg of the hexagonal wrench 3 is seated in the continuous holding slot 4. To engage the slidable lock 2 on the handle 100, the top of the slidable lock is aligned with the surface of the handle 100 which includes the continuous holding slot 4 to be covered.

Figure 8:
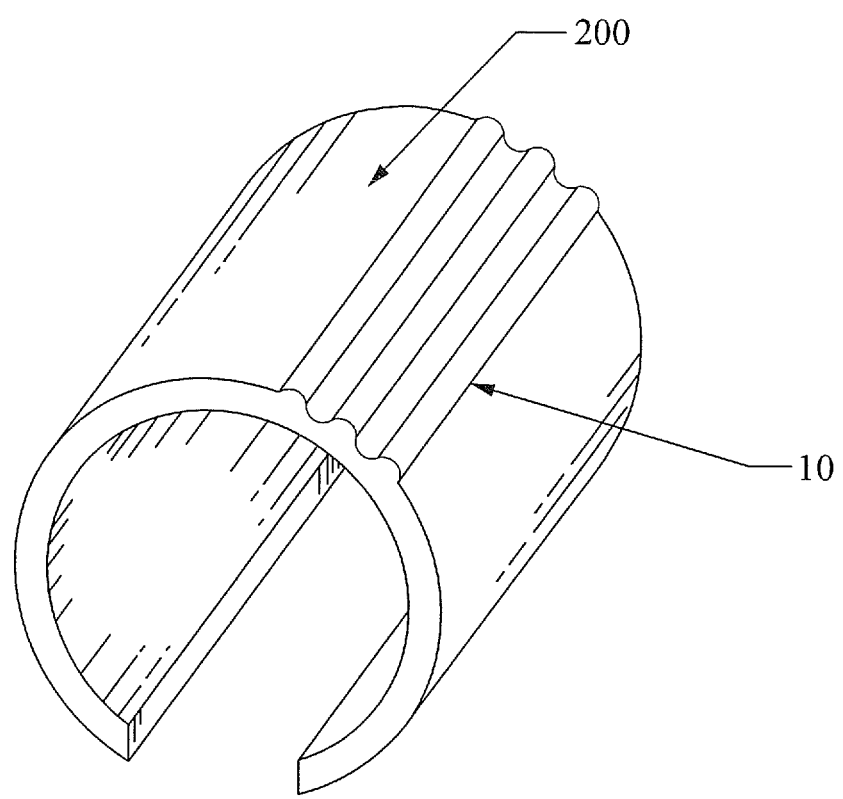
FIG. 8 illustrates a perspective view of the slidable lock including inner ridges for engaging the positioning slots of the handle.

FIG. 8 illustrates a perspective view of the slidable lock 200 in an alternative embodiment. The slidable lock 200 is constructed so that the bottom of the lock 200 is smaller than the top of the lock in order to give the lock 200 a natural spring-like property which locks it to the handle 1. The slidable lock 200 also includes a gap at the bottom.

The lock 200 is designed of a shape to closely correspond to the shape of the handle 1. In some embodiments, the bottom of the lock 200 is designed to be slightly smaller than the top of the lock 200 in order to provide a built-in, self-clamping mechanism allowing the lock 200 to tightly bind itself to the outer surface of the handle 1. The lock 200 is also designed with the external ridges 10. The external ridges 10 are used by the user to unlock the lock 200 from the handle 1 and move the lock 200 along the handle 1. In order to move the lock 200 along the handle 1, the user pinches the lock 200 at the external ridges 10 which forces the bottom of the lock 200 apart and allows the lock 200 to be slid along the handle 1. When pressure is applied to the lock 200 it will slide along the handle when the external ridges 10 are not pinched. However, pinching the external ridges 10 enhances the movement of the lock 200 along the handle. The lock 200 is able to be rotated around the handle 1 in order to be positioned over a holding slot 4 of the handle 1.

Figure 9:
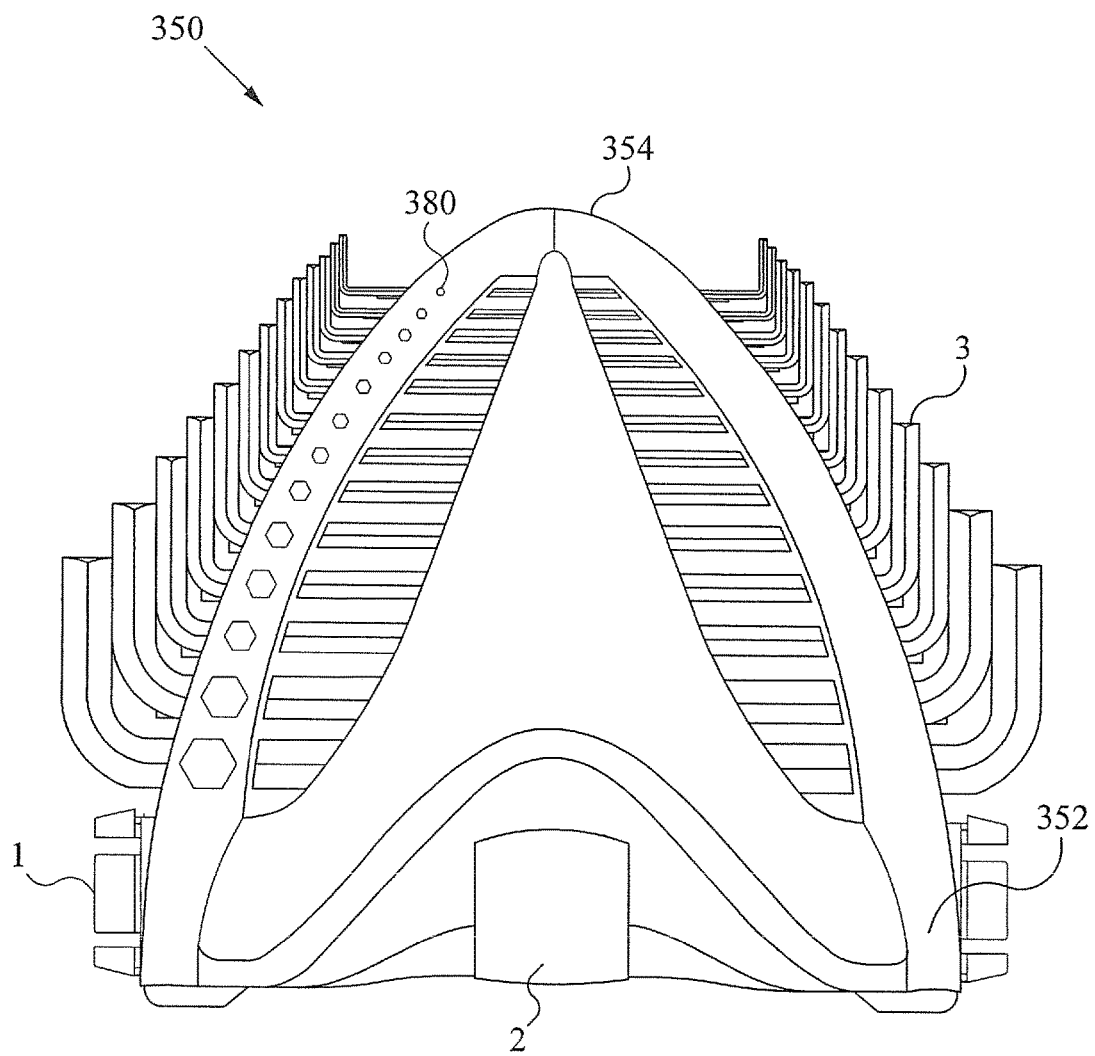
FIG. 9 illustrates a front view of an embodiment of a tool container in a closed configuration in accordance with an embodiment of the present invention.

FIG. 9 illustrates a front view of an embodiment of a tool container 350 in a closed configuration. The tool container 350 includes a tool container body 352 with receiving slots/grooves for receiving each of the hexagonal tools 3. In some embodiments, there are other means for receiving each of the hexagonal tools 3. In some embodiments, only one end of each of the hexagonal tools 3 extends beyond the tool container body 352, and in some embodiments, both ends of each of the hexagonal tools 3 extend beyond the tool container body 352. The tool container 350 also includes a hanging member 354 for hanging the tool container 350 on an object such as a display rod or hook in a store. In some embodiments, another mechanism for hanging the tool container 350 is implemented. In some embodiments, the tool container 350 also includes a location or cavity for receiving the tool handle 100. In some embodiments, the tool container 350 includes a location for receiving any tool handle. In some embodiments, the tool container 350 includes raised features 380 for each of the hexagonal tools 3 which allow the user to determine the correct size hexagonal wrench required before removing the tool from the tool container 350. The user is able to place a fastener over each of the raised features 380 until the correct size tool is determined for that fastener. In some embodiments, labeling of each of the tools is also included on the tool container 350. The labeling is molded onto the tool container 350 or another implementation.

Figure 10:
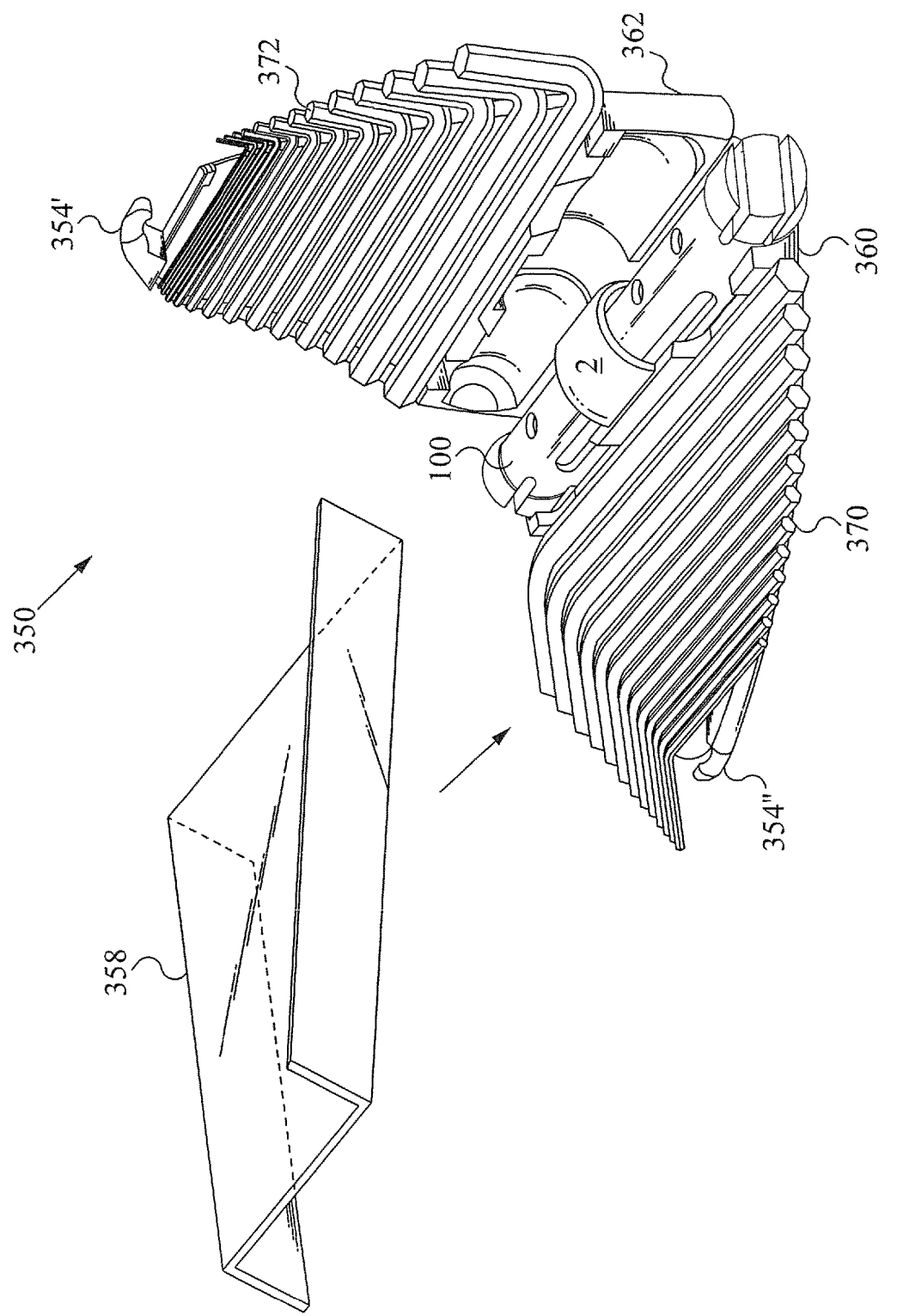
FIG. 10 illustrates a side perspective view of an embodiment of a tool container in an open configuration with a retaining mechanism in accordance with an embodiment of the present invention.

FIG. 10 illustrates a side perspective view of an embodiment of a tool container 350 in an open configuration with a retaining mechanism. The tool container 350 includes a tool container body 352 which further includes a first holding wing 360 and a second holding wing 362. In some embodiments, a hinge or other mechanism allows the tool container 350 to open. In some embodiments, the first holding wing 360 and the second holding wing 362 open outwardly from each other. The first holding wing 360 contains receiving slots/grooves for receiving a first set of hexagonal tools 370, and the second holding wing 362 contains receiving slots/grooves for receiving a second set of hexagonal tools 372. In some embodiments, the first set of hexagonal tools 370 are standard and the second set of hexagonal tools are metric or vice versa. In some embodiments, there is only one set of tools. In some embodiments, there are other means for receiving each of the hexagonal tools. In some embodiments, the tool container 350 includes a location for receiving the tool handle 100. In some embodiments, the tool container 350 includes a location for receiving any tool handle. In some embodiments, the tool container 350 also includes a hanging member 354 for hanging the tool container 350 on an object such as a display rod or hook in a store. In some embodiments, another mechanism for hanging the tool container 350 is implemented.

In some embodiments, the hanging member 354 includes a first member 354' and a second member 354" which open in opposite directions when the tool container 350 is opened. In some embodiments, the first and second members 354' and 354" are configured as a partial extension from the tool container body 352, specifically, the first member 354' is configured as a partial extension from the first holding wing 360, and the second member 354" is configured as a partial extension from the second holding wing 362. In some embodiments, the first and second members 354' and 354" are each configured as a loop so that there is an aperture within the loop. In other embodiments, the first and second members 354' and 354" are configured in another fashion.

A retaining mechanism 358 is inserted within the tool container 350, specifically, between the first holding wing 360 and the second holding wing 362 and extends beyond the hexagonal tools to prevent the tools from being removed from the tool container 350. In some embodiments, the retaining mechanism 358 at least partially extends around the hexagonal tools. After the tool container 350 is opened, the retaining mechanism 358 is able to be removed, and subsequently, the hexagonal tools are able to be removed. In some embodiments, the retaining mechanism 358 is plastic. In some embodiments, the retaining mechanism is metal. In some embodiments, the retaining mechanism comprises a different material.

Figure 11:
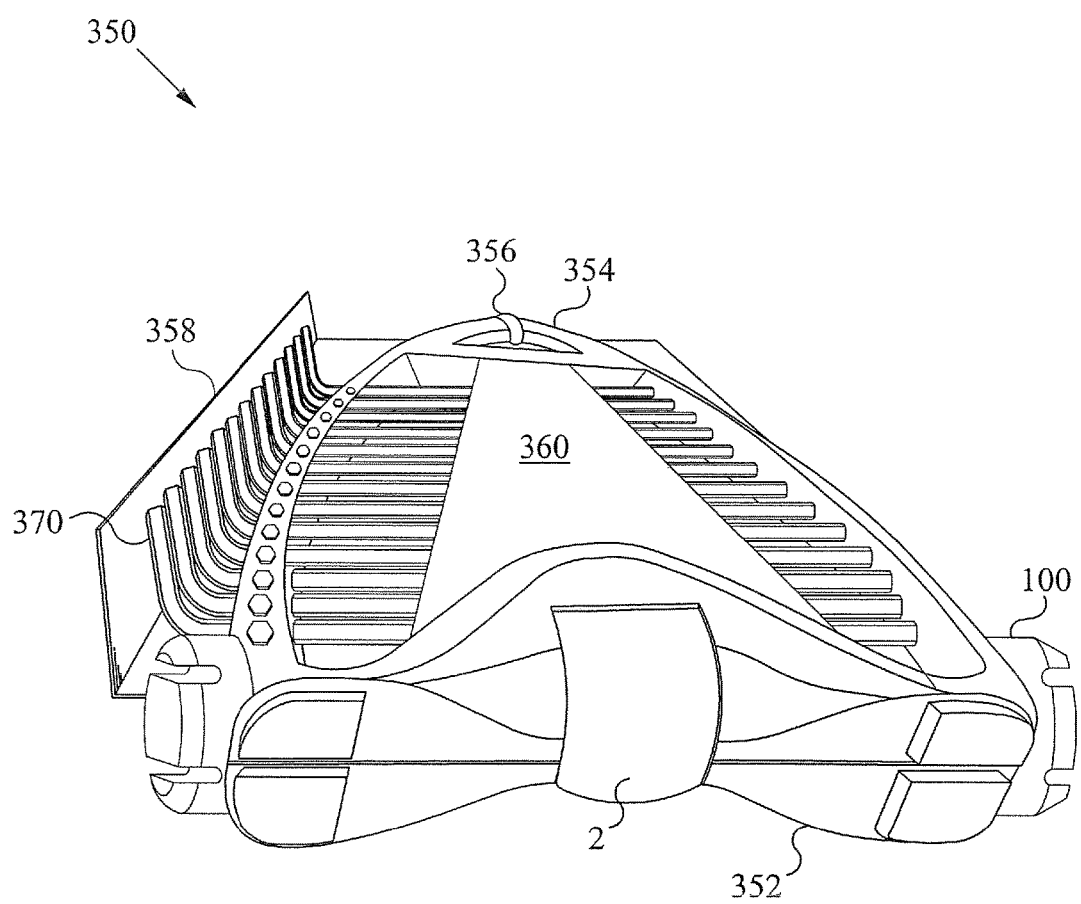
FIG. 11 illustrates a perspective view of an embodiment of a tool container in a closed configuration with a securing mechanism and a retaining mechanism in accordance with an embodiment of the present invention.
Figure 12:
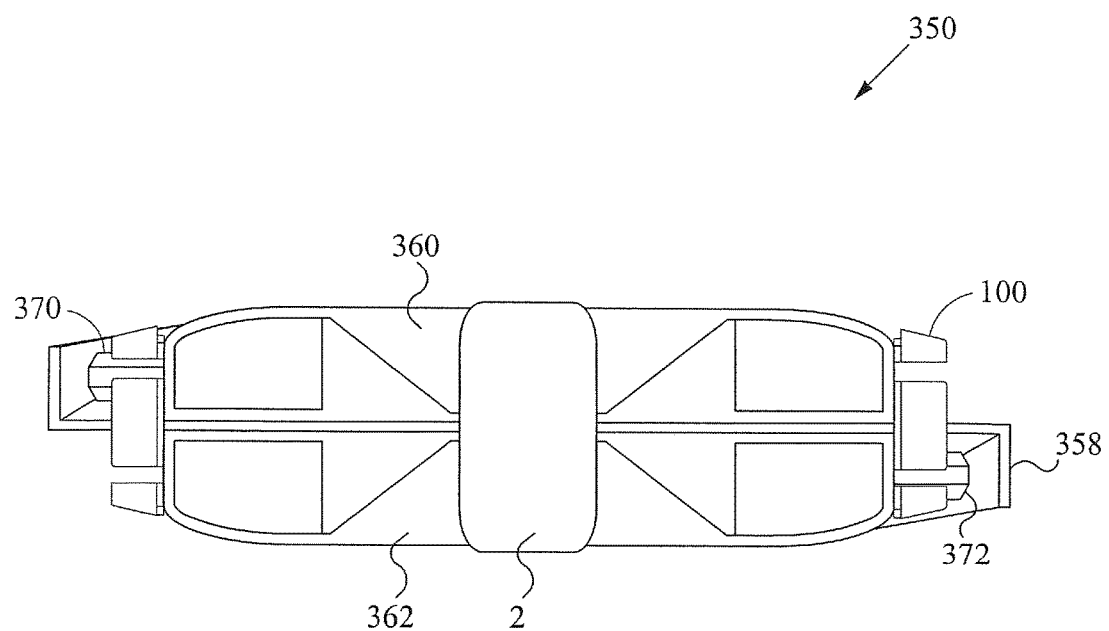
FIG. 12 illustrates a bottom view of an embodiment of a tool container in a closed configuration with a retaining mechanism in accordance with an embodiment of the present invention.

FIG. 11 illustrates a perspective view of an embodiment of a tool container 350 in a closed configuration with a securing mechanism and a retaining mechanism. The tool container 350 includes a tool container body 352 with a first holding wing 360 and a second holding wing 362 (FIG. 12). The first holding wing 360 contains receiving slots/grooves for receiving a first set of hexagonal tools 370, and the second holding wing 362 (FIG. 12) contains receiving slots/grooves for receiving a second set of hexagonal tools 372 (FIG. 12). The tool container 350 also includes a hanging member 354 for hanging the tool container 350 on an object such as a display rod or hook in a store. In some embodiments, another mechanism for hanging the tool container 350 is implemented.

A retaining mechanism 358 is stored within the tool container 350, specifically between the first holding wing 360 and the second holding wing 362 (FIG. 12) and extends beyond the hexagonal tools to prevent the tools from being removed. In some embodiments, the retaining mechanism 358 at least partially extends around the hexagonal tools. After the tool container 350 is opened, the retaining mechanism 358 is able to be removed, and subsequently, the hexagonal tools are able to be removed.

In some embodiments, a securing mechanism 356 is implemented so that the tool container 350 is not able to be opened until the securing mechanism 356 is removed. The securing mechanism 356 is able to be any device that prevents the tool container 350 from being opened until the tool container 350 should be permitted to be opened. Examples of securing mechanisms include, but are not limited to, zip ties, locks and magnetic locks. While the securing mechanism 356 is in place, the retaining mechanism 358 is not able to be removed, thus the tools are not able to be removed. In some embodiments, the tool container 350 is secured closed in another fashion, such as by gluing, sealing the hanging member together or other ways.

FIG. 12 illustrates a bottom view of an embodiment of a tool container 350 in a closed configuration with a retaining mechanism. The container body 352 includes a first holding wing 360 and a second holding wing 362. The first holding wing 360 holds a first set of hexagonal tools 370, and the second holding wing 362 holds a second set of hexagonal tools 372. A retaining mechanism 358 is stored within the tool container 350, specifically between the first holding wing 360 and the second holding wing 362 and extends beyond the hexagonal tools to prevent the tools from being removed. In some embodiments, the retaining mechanism 358 at least partially extends around the hexagonal tools. After the tool container 350 is opened, the retaining mechanism 358 is able to be removed, and subsequently, the hexagonal tools are able to be removed.

Figure 13:
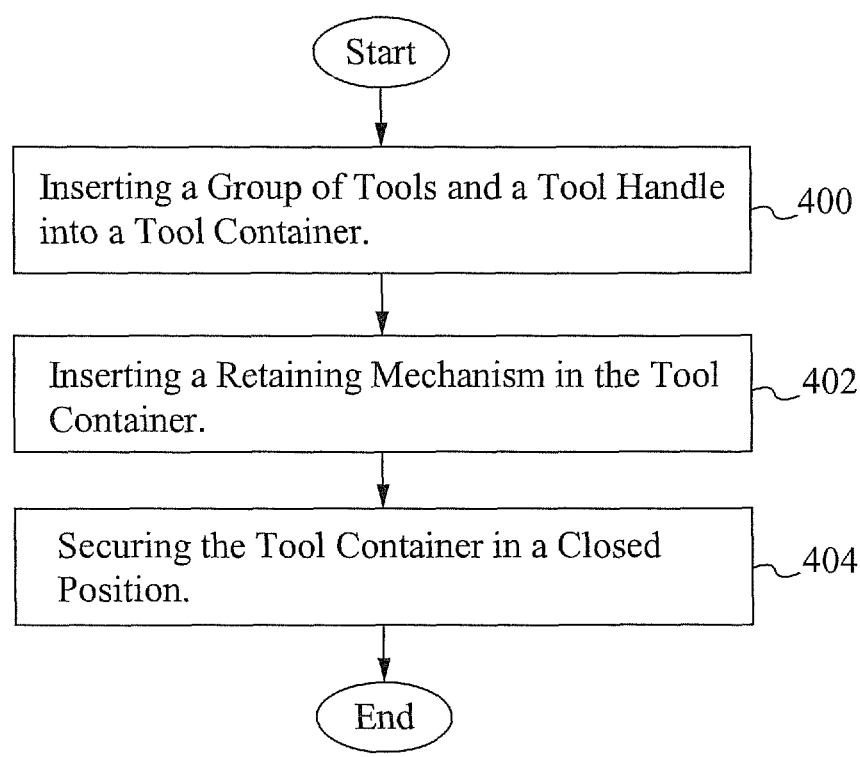
FIG. 13 illustrates a flowchart of a method of securing a group of one or more tools in a tool container in accordance with an embodiment of the present invention.

FIG. 13 illustrates a method of securing a group of one or more tools in a tool container 350. In the step 400, the group of tools is inserted into the tool container 350. In some embodiments, a set of metric tools are inserted into a first holding wing of the tool container 350 and a set of standard tools are inserted into a second holding wing of the tool container 350. In some embodiments, a tool handle 100 is also inserted into the tool container 350. In the step 402, a retaining mechanism 358 is inserted into the tool container 350. The retaining mechanism 358 is inserted between holding wings and is configured so that the tools are not removable while the retaining mechanism is in place. In the step 404, the tool container 350 is secured in a closed position with a securing mechanism 356. With the tool container 350 secured in a closed position, the retaining mechanism is not removable, thus making the tools not removable.

Figure 14:
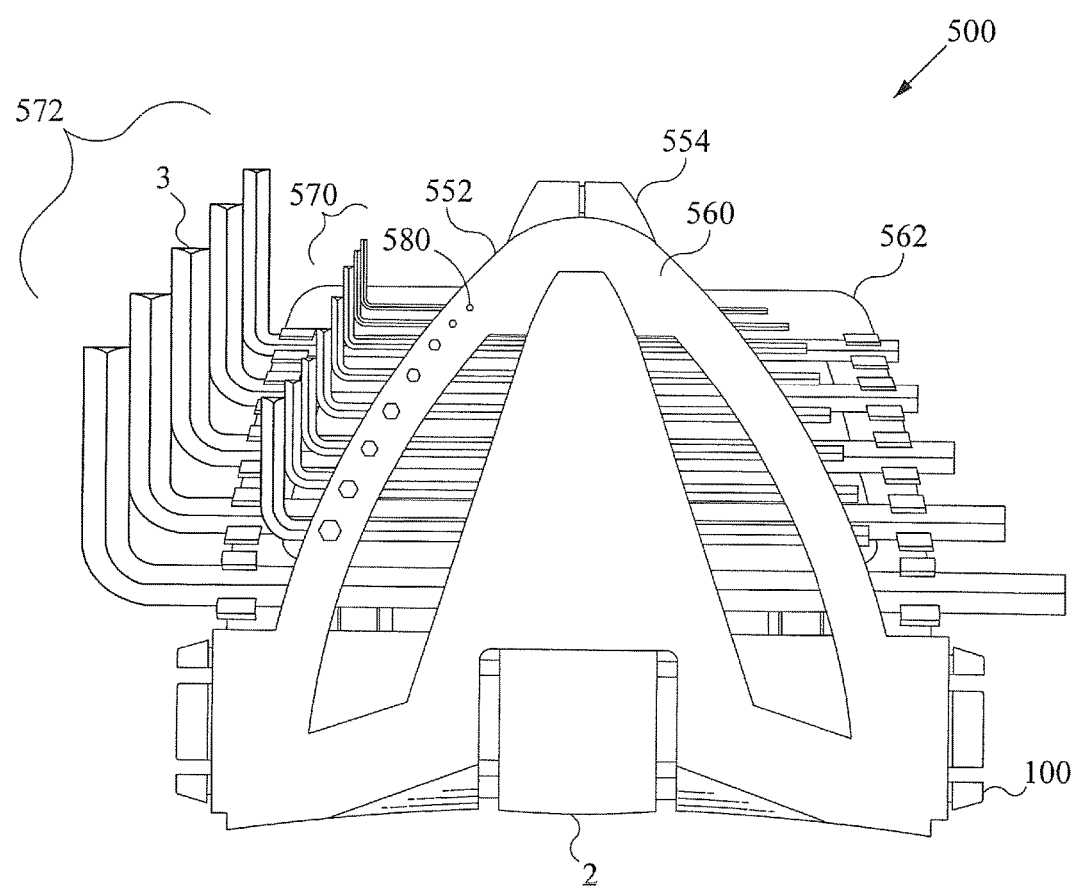
FIG. 14 illustrates a front view of an embodiment of a tool container in a closed configuration in accordance with an embodiment of the present invention.

FIG. 14 illustrates a front view of an embodiment of a tool container 500 in a closed configuration. The tool container 500 includes a tool container body 552 with receiving slots/grooves for receiving each of the hexagonal tools 3. In some embodiments, there are other means for receiving each of the hexagonal tools 3. In some embodiments, only one end of each of the hexagonal tools 3 extends beyond the tool container body 502, and in some embodiments, both ends of each of the hexagonal tools 3 extend beyond the tool container body 552. The container body 552 includes a first holding wing 560 and a second holding wing 562. The first holding wing 560 holds a first set of hexagonal tools 570, and the second holding wing 562 holds a second set of hexagonal tools 572. The tool container 500 also includes a hanging member 554 for hanging the tool container 500 on an object such as a display rod or hook in a store. In some embodiments, another mechanism for hanging the tool container 500 is implemented. In some embodiments, the tool container 500 also includes a location or cavity for receiving the tool handle 100. In some embodiments, the tool container 500 includes a location for receiving any tool handle. In some embodiments, the tool container 500 includes raised features 580 for each of the hexagonal tools 3 which allow the user to determine the correct size hexagonal wrench required before removing the tool from the tool container 500. The user is able to place a fastener over each of the raised features 580 until the correct size tool is determined for that fastener. In some embodiments, labeling of each of the tools is also included on the tool container 500. The labeling is molded onto the tool container 500 or another implementation.

As an example, a set of hexagonal wrenches are inserted into the holding wings of the tool container, with the metric tools in one wing and the standard tools in another wing. The tool handle is also inserted into the tool container in an appropriate location. A retaining mechanism is then inserted in between the holding wings of the tool container. The retaining mechanism is a piece of plastic that is configured so that the hexagonal wrenches are not able to be removed while the retaining mechanism is in place. The tool container is closed such that the wings are closed upon the retaining mechanism. The tool container is then secured closed by a securing mechanism such as a zip tie which goes in and around a hanging member of the tool container. The hanging member then enables the tool container to be hung on a hook in a store for display. While in the retail store, the securing mechanism prevents the tool container from being opened, which prevents the retaining mechanism from being removed from the tool container, which prevents the hexagonal wrenches from being removed from the tool container. After a user purchases the tool container which includes the hexagonal wrenches and the tool handle, the user utilizes a device such as a knife, scissors, wire cutters or another device to remove the securing mechanism. After the securing mechanism is removed, the user opens the tool container. Once the tool container is opened, the securing mechanism is able to be removed and is able to be discarded. The tools are then easily removable and re-insertable into the tool container.

In some embodiments, the retaining mechanism comprises a first flat surface extending in a horizontal direction with a second surface extending in a vertical direction in a first direction at one end of the first flat surface and a third flat surface extending in a vertical direction in an opposite direction at the opposite end of the first flat surface. In some embodiments, the retaining mechanism comprises more than one component such as two oppositely pointing L-shaped components. The retaining mechanism is able to be any configuration and comprise any number of components as long as it is able to retain the tools within the tool container.

The circular, cylindrical embodiment of the tool handle is utilized to provide better gripping ability of a tool such as a hexagonal wrench. The circular, cylindrical tool handle is utilized by inserting a tool into a proper slot and then moving the lock to secure the tool in place. The tool container is utilized to hold one or more tools along with the tool handle. The tools are easily accessible in the tool container. Furthermore, while available for purchase, such as in a retail store, a retaining mechanism and a securing mechanism ensure that no tools are stolen or otherwise removed from the tool container. After the tool container is purchased, a user removes the securing mechanism and then the retaining mechanism. Then, the user is able to remove, utilize and return the tools as desired.

In operation, the tool container includes a retaining mechanism and a securing mechanism which are able to be used to allow the tool container and tools to be displayed yet protected from theft or removal without the need for additional packaging. This removes the need for expensive added containment materials such as plastic that goes all around the tool container. Moreover, since the retaining mechanism utilizes less plastic, it is also more environmentally friendly.

It should further be understood by a person skilled in the art that the tool handle of the present invention is able to be modified or adapted for use with tool drivers and tools having shapes other than hexagonal. Further improvements and modifications which become apparent to persons of ordinary skill in the art only after reading this disclosure, the drawings and the appended claims are deemed within the spirit and scope of the present invention.

What is claimed is:

1. A circular cylindrical tool handle for accepting and holding one or more tools of differing sizes during use, wherein the one or more tools include an elongated rod having a bend through a predetermined angle and including a proximal end, and a mounting end between the bend and a distal end, comprising:
   one or more holding slots each integrally formed within the tool handle, each of the one or more holding slots for receiving and holding an appropriate one of the tools, wherein the mounting end of the appropriate one of the tools engages within a corresponding one of the one or more holding slots; and
   a lock having an interior locking component for securing the lock around the one or more tools within the tool handle.

2. The tool handle according to claim 1 wherein the tool handle includes a circular cylindrical outer surface, the outer surface including two ends opposite from one another.

3. The tool handle according to claim 1 wherein the lock applies a securing force to a segment of the one or more tools, further wherein the locking component includes a raised component for further securing the lock around the one or more tools within the tool handle.

4. The tool handle according to claim 1 further comprising a tool holder, wherein the tool holder comprises:
   a. a tool holding member configured to hold the one or more tools of multiple sizes securely upon insertion; and
   b. a tool handle holding member coupled to the tool holding member, wherein the tool handle is configured to hold the tool handle adjacent to the tool holding member.

5. The tool handle according to claim 4 wherein the tool holding member includes a first side having a first dimension and a second side having a second dimension, the first side positioned proximal to the tool holding member and the second side positioned distal to the tool holding member, wherein the first dimension is larger in length than the second dimension.

6. A circular, cylindrical-shaped tool handle for holding a tool comprising:
   a. one or more holding slots for holding a tool;
   b. one or more receiving holes for receiving the tool; and
   c. a lock mechanism comprising an interior locking component for securing the tool within the tool handle;
   wherein when the tool is secure within the tool handle, the tool extends into and through a body of the tool handle.

7. The tool handle for holding a tool of claim 6, wherein the tool handle holds a hexagonal wrench comprising an L-shaped body, including a long leg member and a short leg member.

8. The tool handle for holding a tool of claim 7, wherein the hexagonal wrench is English size.

9. The tool handle for holding a tool of claim 7, wherein the hexagonal wrench is metric size.

10. The tool handle for holding a tool of claim 7, wherein the one or more receiving holes are positioned diametrically opposed to the one or more holding slots.

11. The tool handle for holding a tool of claim 10, wherein the one or more holding slots comprises one or more contoured compartments.

12. The tool handle for holding a tool of claim 11, wherein the one or more holding slots are a depth such that when the tool handle holds a wrench, the top of the short leg member is flush with the top of the handle and the long leg member protrudes through the diametrically opposed receiving slot so that when the tool handle is locked it tightly holds the wrench.

13. The tool handle for holding a tool of claim 7, wherein the one or more holding slots are different sizes to hold different size wrenches.

14. The tool handle for holding a tool of claim 13, wherein the size of the wrench corresponding to the one or more holding slots is molded into, printed on, or engraved into the handle.

15. The tool handle for holding a tool of claim 6, wherein the lock mechanism comprises one or more of a cam, a bump or another appropriate implementation for securing the lock in place on the tool.

16. The tool handle for holding a tool of claim 6, wherein the one or more holding slots are continuous along the tool handle.

17. A circular cylindrical tool handle for accepting and holding one or more tools of differing sizes during use, wherein the one or more tools include an elongated rod having a bend through a predetermined angle and including a proximal end, and a mounting end between the bend and a distal end, comprising:
   a. one or more holding slots each integrally formed within the tool handle for receiving and holding an appropriate one of the tools, wherein the mounting end of the appropriate one of the tools engages within a corresponding one of the one or more holding slots; and
   b. a slidable lock having an interior locking component for securing the lock around the one or more tools within the tool handle.

\* \* \* \* \*